(12) United States Patent
Thorne et al.

(10) Patent No.: US 6,747,558 B1
(45) Date of Patent: Jun. 8, 2004

(54) METHOD AND APPARATUS FOR PROVIDING CONTAINER SECURITY WITH A TAG

(75) Inventors: Roderick E. Thorne, Palo Alto, CA (US); Philip J. Keleshian, San Jose, CA (US); Timothy R. Redler, Campbell, CA (US); Joseph S. Chan, Milpitas, CA (US); Nikola Cargonja, San Carlos, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/133,270

(22) Filed: Apr. 26, 2002

Related U.S. Application Data

(60) Provisional application No. 60/332,480, filed on Nov. 9, 2001.

(51) Int. Cl.$^7$ ................................................. G08B 13/24
(52) U.S. Cl. .................. 340/551; 340/545.6; 340/568.1
(58) Field of Search ...................... 340/551, 572.1, 340/572.8, 572.9, 568.1, 568.2, 568.8, 432, 571, 568.6, 545.6

(56) References Cited

U.S. PATENT DOCUMENTS

| | | | |
|---|---|---|---|
| 3,639,897 A | | 2/1972 | Teich .......................... 340/430 |
| 3,656,100 A | | 4/1972 | Beltrami ................. 340/430 X |
| 3,665,449 A | * | 5/1972 | Elder et al. .............. 340/572.1 |
| 3,688,256 A | | 8/1972 | D'Ausilio et al. .......... 340/430 |
| 3,697,941 A | | 10/1972 | Christ ......................... 340/991 |
| 3,735,335 A | | 5/1973 | Kaplan et al. .............. 340/991 |
| 3,757,290 A | | 9/1973 | Ross et al. .................. 340/991 |
| 3,772,669 A | * | 11/1973 | Johnston et al. ........ 340/551 X |
| 3,848,243 A | | 11/1974 | Schirmer .................... 340/517 |
| 3,961,323 A | | 6/1976 | Hartkorn .................... 340/539.1 |
| 4,095,872 A | | 6/1978 | Stieff et al. ................. 385/115 |
| 4,209,787 A | | 6/1980 | Freeny, Jr. .................. 342/457 |
| 4,262,284 A | | 4/1981 | Stieff et al. ................. 340/541 |
| 4,529,982 A | | 7/1985 | Karlstrom et al. .......... 340/991 |

(List continued on next page.)

FOREIGN PATENT DOCUMENTS

| | | |
|---|---|---|
| EP | 0 467 036 A2 | 1/1992 |
| EP | 0 825 554 A1 | 2/1998 |
| EP | 0 984 400 A2 | 3/2000 |
| WO | WO 98/32092 | 7/1998 |
| WO | WO 01/08116 A2 | 2/2001 |
| WO | WO 01/27891 A1 | 4/2001 |
| WO | WO 01/44831 A1 | 6/2001 |

OTHER PUBLICATIONS

"KXU–LFTX1 Transceiver", Cover Sheet with Block Diagram (1 sheet) and Schematic (1 sheet), submitted to FCC on Jul. 29, 1999 by RF Technologies.

"KXU–LUXP1 Transponder", Cover Sheet with Block Diagram (1 sheet) and Schematic (1 sheet), submitted to FCC on Jul. 28, 1999 by RF Technologies.

Arthur E. Anderson III, James G. Eagleson, and William E. Blasdell, U.S. Ser. No. 60/230,728 Filed Sep. 7, 2000 (Attorney Docket No. 066698.0123).

(List continued on next page.)

*Primary Examiner*—Thomas J Mullen, Jr.
(74) *Attorney, Agent, or Firm*—Haynes and Boone, LLP

(57) ABSTRACT

A device (12) facilitates sealing and tracking of a container (18). The device includes a bolt (166) which extends through openings in a latch mechanism (19) on the container. The bolt also passes through spaced coils (251, 252) of the seal device. The seal device uses one coil to generate a magnetic field, while monitoring the corresponding magnetic field induced in the other coil. Tampering with the bolt affects the magnetic field, which in turn permits the seal device to detect the tampering. The seal device periodically transmits wireless signals (71), which can be remotely received for purposes of tracking the container and monitoring the integrity of the seal.

19 Claims, 5 Drawing Sheets

U.S. PATENT DOCUMENTS

| | | | |
|---|---|---|---|
| 4,536,754 A * | 8/1985 | Holce et al. | 340/568.2 |
| 4,627,248 A | 12/1986 | Haworth | 70/134 |
| 4,683,461 A | 7/1987 | Torre | 340/551 |
| 4,688,244 A | 8/1987 | Hannon et al. | 377/58 |
| 4,750,197 A | 6/1988 | Denekamp et al. | 455/404.2 |
| 4,768,816 A | 9/1988 | Bakula | 292/218 |
| 4,811,578 A | 3/1989 | Masoncup et al. | 340/542 X |
| 4,811,977 A | 3/1989 | Swift et al. | 292/307 A |
| 4,816,803 A | 3/1989 | Brown | 340/426.28 |
| 4,833,295 A | 5/1989 | Locker et al. | 219/121.63 |
| 4,853,692 A | 8/1989 | Wolk et al. | 340/573.1 |
| 4,877,276 A | 10/1989 | Pastva | 292/218 |
| 4,920,334 A | 4/1990 | DeVolpi | 340/568.4 |
| 4,946,210 A | 8/1990 | Fuehrer | 292/318 |
| 4,990,890 A | 2/1991 | Newby | 340/426.18 |
| 4,996,909 A | 3/1991 | Vaché et al. | 454/184 |
| 5,005,883 A | 4/1991 | Guiler | 292/327 |
| 5,025,253 A | 6/1991 | DiLullo et al. | 340/10.41 |
| 5,050,794 A | 9/1991 | Wischusen, III | 229/125.26 |
| 5,056,837 A | 10/1991 | Fuehrer | 292/307 R |
| 5,097,253 A | 3/1992 | Eschbach et al. | 340/545.1 |
| 5,120,097 A | 6/1992 | Fattori et al. | 292/318 |
| 5,125,700 A | 6/1992 | Fattori et al. | 292/318 |
| 5,127,687 A | 7/1992 | Guiler | 292/327 |
| 5,189,396 A | 2/1993 | Stobbe | 340/541 |
| 5,247,564 A | 9/1993 | Zicker | 379/40 |
| 5,284,036 A | 2/1994 | Rosenbaum | 70/14 |
| 5,347,274 A | 9/1994 | Hassett | 340/988 |
| 5,422,627 A | 6/1995 | Tap et al. | 340/542 |
| 5,443,190 A | 8/1995 | Cucheran et al. | 224/405 |
| 5,490,079 A | 2/1996 | Sharpe et al. | 705/418 |
| 5,572,191 A | 11/1996 | Lundberg | 340/572.6 |
| 5,594,738 A | 1/1997 | Crisler et al. | 370/347 |
| 5,627,517 A | 5/1997 | Theimer et al. | 340/572.1 |
| 5,631,642 A | 5/1997 | Brockelsby et al. | 340/993 |
| 5,656,996 A | 8/1997 | Houser | 340/541 |
| 5,686,902 A | 11/1997 | Reis et al. | 340/10.2 |
| 5,774,876 A | 6/1998 | Woolley et al. | 705/28 |
| 5,793,290 A | 8/1998 | Eagleson et al. | 340/573.4 |
| 5,804,810 A | 9/1998 | Woolley et al. | 235/492 |
| 5,892,441 A | 4/1999 | Woolley et al. | 340/539.26 |
| 5,959,568 A | 9/1999 | Woolley | 340/568.1 X |
| 5,977,913 A | 11/1999 | Christ | 342/465 |
| 6,034,603 A | 3/2000 | Steeves | 340/10.2 |
| 6,067,476 A | 5/2000 | Siler | 700/79 |
| 6,069,563 A | 5/2000 | Kadner et al. | 340/571 |
| 6,094,164 A | 7/2000 | Murphy | 342/357.07 |
| 6,140,956 A | 10/2000 | Hillman et al. | 342/357.07 |
| 6,243,005 B1 * | 6/2001 | Haimovich et al. | 340/568.1 X |
| 6,281,793 B1 | 8/2001 | Haimovich et al. | 340/545.1 |
| 6,294,953 B1 | 9/2001 | Steeves | 329/341 |
| 6,298,306 B1 | 10/2001 | Suarez et al. | 701/213 |
| 6,339,745 B1 | 1/2002 | Novik | 701/208 |

OTHER PUBLICATIONS

James G. Eagleson, Arthur E. Anderson III, Timothy K. Brand, Nikola Cargonja, and Ravindra U. Rajapakse, U.S. Ser. No. 09/841,780, Filed Apr. 24, 2001 (Attorney Docket No. 066698.0126).

James G. Eagleson, William E. Blasdell, Arthur E. Anderson III, and Nikola Cargonja, U.S. Ser. No. 09/841,782, Filed Apr. 24, 2001 (Attorney Docket No. 066698.0127).

Joseph S. Chan and Nikola Cargonja, U.S. Ser. No. 09/841,774, Filed Apr. 24, 2001 (Attorney Docket No. 066698.0128).

James G. Eagleson, Joseph S. Chan, and Nikola Cargonja, U.S. Ser. No. 09/841,776, Filed Apr. 24, 2001 (Attorney Docket No. 066698.0129).

Roderick E. Thorne, Philip J. Keieshian, Timothy R. Redler, Joseph S. Chan, and Nikola (nmi) Cargonja, U.S. Ser. No. 60/332,480, Filed Nov. 9, 2001 (Attorney Docket No. 066698.0133).

"Electromagnetic Radiation and How it Affects Your Instruments", OSHA Field Service Memo, OSHA Cincinnati Laboratory, Cincinnati, Ohio, pp. 1, 8, 9 and 10, May 20, 1990.

Straw, R. Dean, editor, "The ARRL Antenna Book", The American Radio Relay League, Inc., Newington, Connecticut, title page, copyright page and pp. 2–6 and 2–7.

Kraus, John D., "Antennas", Second Edition, McGraw–Hill, Inc., New York, New York, title page, copyright page, and pp. 60–61, 1988.

Lancaster, Don, "Tech Musings", Synergetics, Thatcher, Arizona, pp. 138.1–138.6, 07/99.

* cited by examiner

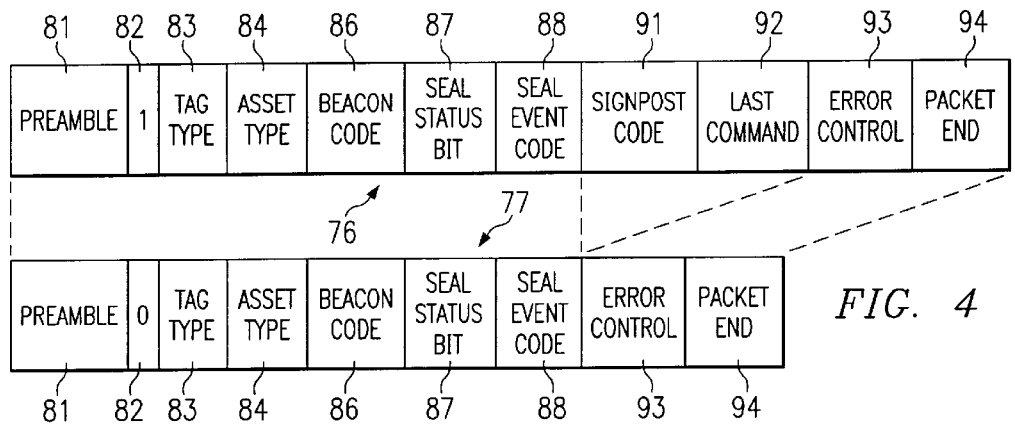
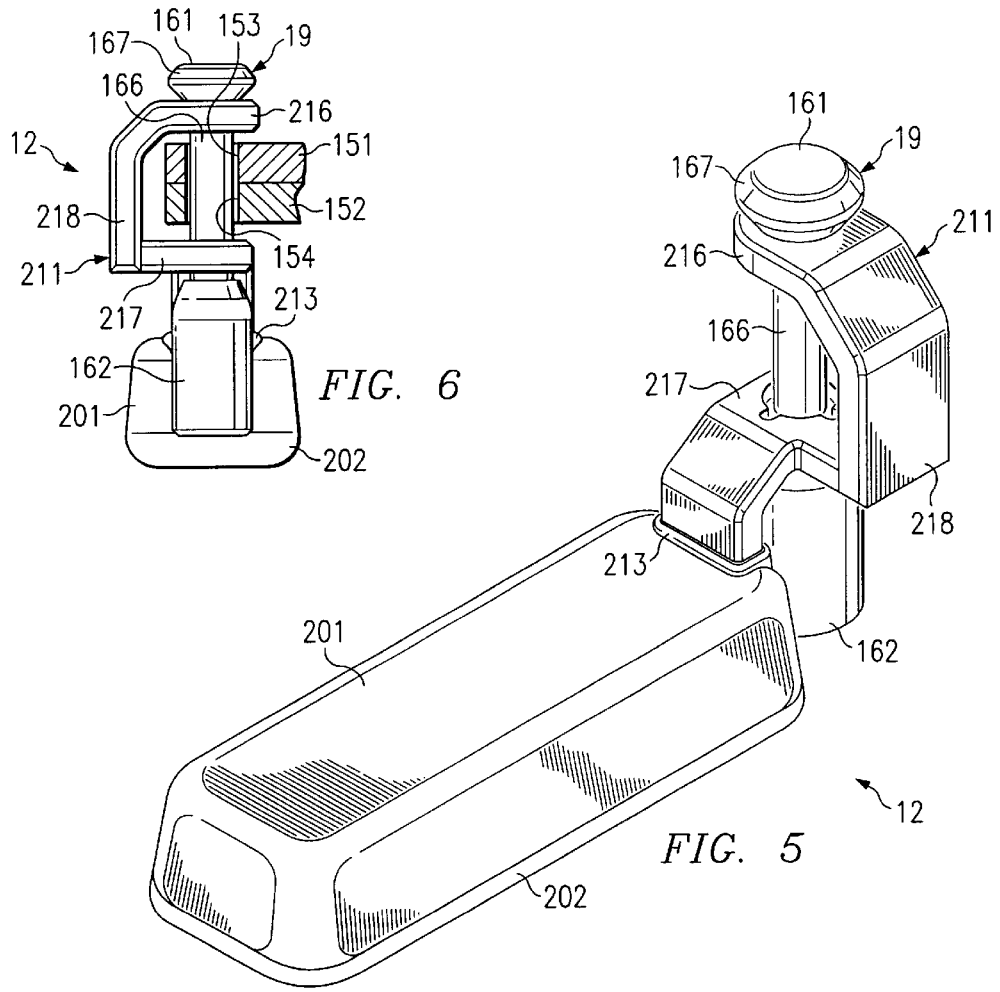

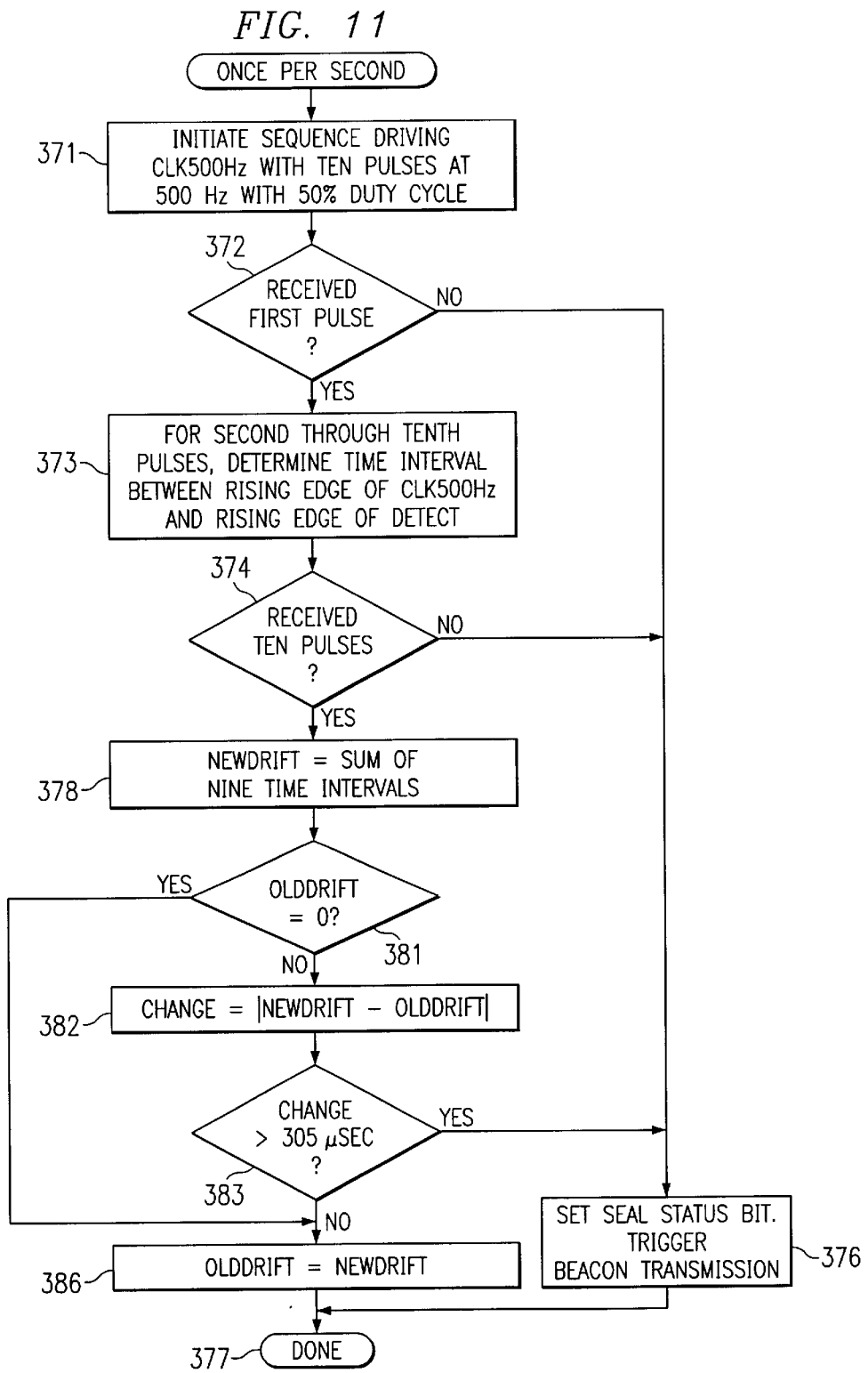

METHOD AND APPARATUS FOR PROVIDING CONTAINER SECURITY WITH A TAG

This application claims the priority under 35 U.S.C. §119 of provisional application No. 60/332,480 filed Nov. 9, 2001.

STATEMENT REGARDING COPYRIGHT RIGHTS

A portion of this patent disclosure is material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to containers which can hold one or more items and, more particularly, to a method and apparatus for sealing and tracking such containers.

BACKGROUND OF THE INVENTION

One common use for containers is the shipment of goods from location to another. One known type of container is known as an intermodal container. Goods are packed into the intermodal container, and a door of the container is closed and latched. Then, the container is transported to a destination by one or more vehicles, such as trucks, planes, trains and/or ships. At the destination, the container door is unlatched and opened, and the goods are removed.

The transportation industry has recognized that it is important to provide security for goods which are in such containers. As one aspect of this, the containers need to be tracked, in order to avoid the type of loss which results when the container is stolen or inadvertently misrouted or misplaced during shipment. In addition to tracking containers, there is a need to prevent goods from being removed from a container while it is in transit to its destination, even if the container itself is not stolen, misrouted or misplaced.

For this purpose, there are existing seal devices which are used to seal or lock the latch mechanism for the door of the container. The most common type of seal device includes a disposable bolt and reusable housing. The bolt is inserted through the latching mechanism of the container, and the reusable housing is then pressed onto an end of the bolt, which causes cooperating structure of the bolt and housing to completely prevent the end of the bolt from being withdrawn in a direction opposite to its insertion direction. In order to remove this seal device from a container, the disposable bolt must be cut with a bolt cutter. The end of the bolt which remains in the housing can then be removed from the housing, for example by continuing to move it in the insertion direction until it has passed completely through the housing.

Seal devices of this known type often have a unique serial number on the reusable housing. However, a thief with proper materials can cut the bolt in order to gain access to the container, and can then use an identical bolt with the reusable housing in order to again seal the container. Since the serial number on the housing remains the same, the seal device gives the impression that there has been no tampering, when in fact tampering did occur. While these types of existing techniques for sealing and tracking containers have been generally adequate for their intended purposes, they have not been satisfactory in all respects.

In this regard, tracking of containers and inspection of existing seal devices typically involve a significant degree of manual activity, which is relatively expensive. Further, for reasons discussed above, even careful manual inspection may not reveal the fact that a seal device has been removed and replaced. The National Cargo Security Council has estimated that, as of 1998, the annual cargo theft in the United States had reached a level of approximately $10 billion per year, which after adjustment for inflation is still approximately 5 times higher than 20 to 25 years ago. And this estimate reflects only the value of the lost goods. When the cost of incident investigations, insurance paperwork and insurance claims are also taken into account, the actual annual business impact of cargo theft has been estimated to be $30 billion to $60 billion per year.

The Council noted that 85% of all business security losses are attributed to the theft or loss of products while in transit. Moreover, it is estimated that 80% of theft is perpetrated internally. Many losses go unnoticed until final delivery, due in part to the nature of multi-modal transportation. By the time of delivery, backtracking to the exact point where the loss occurred is often difficult or impossible.

SUMMARY OF THE INVENTION

From the foregoing, it may be appreciated that a need has arisen for a method and apparatus which facilitate better sealing and/or tracking techniques. According to the present invention, a method and apparatus are provided to address this need, and involve: effecting a seal between first and second parts movable relative to each other between first and second positions, including the provision of sealing structure cooperable with the first and second parts in the first position thereof in a manner limiting movement of the parts away from the first position; sensing a magnetic flux characteristic which is a function of the sealing structure; and detecting a change in the magnetic flux characteristic which represents a disruption of the sealing structure.

BRIEF DESCRIPTION OF THE DRAWINGS

A better understanding of the present invention will be realized from the detailed description which follows, taken in conjunction with the accompanying drawings, in which:

FIG. 4 is a diagrammatic view of two digital words which each have several different fields of information and which represent standardized formats for data transmitted by the seal tag in the apparatus of FIG. 1;

FIG. 5 is a diagrammatic perspective view of the seal tag from the apparatus of FIG. 1, and also shows a lock which is used to seal a container, the lock and container being components of the apparatus of FIG. 1;

FIG. 6 is a diagrammatic end view of the seal tag and lock of FIG. 5, and also shows in cross section two elements that are part of a latching mechanism on the container;

FIGS. 9 through 11 are each a flowchart showing a respective portion of a firmware program executed by a microcontroller which is part of the seal tag of FIG. 1.

DETAILED DESCRIPTION OF THE INVENTION

Figure 1:
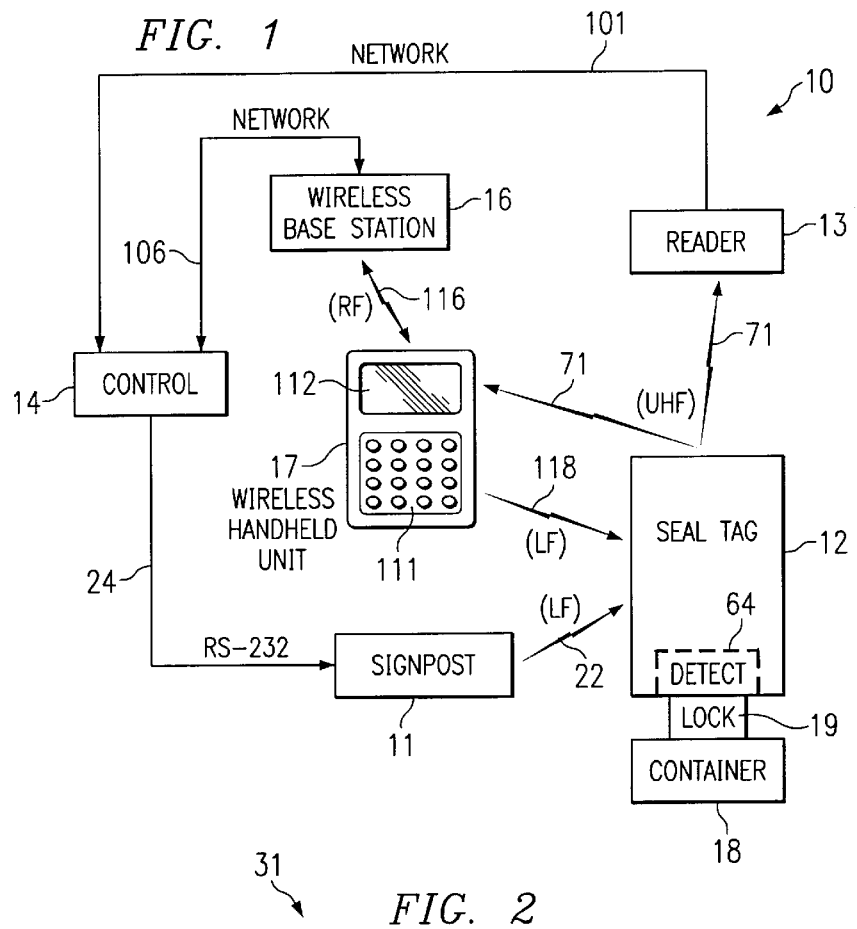
FIG. 1 is a block diagram of an apparatus which embodies features of the present invention.

FIG. 1 is a block diagram of an apparatus 10 which embodies features of the present invention. The apparatus 10 includes a signpost 11, a seal tag 12, a reader 13, a control system 14, a wireless base station 16, a wireless handheld unit 17, a container 18, and a seal or lock 19. The lock 19 secures a latch provided on the container 18, and the seal tag 12 cooperates with the lock 19 in a manner described in more detail later. The apparatus 10 will typically include many signposts of the type shown at 11, many seal tags of the type shown at 12, several handheld units of the type shown at 17, and several readers of the type shown at 13. However, for clarity in explaining the present invention, FIG. 1 shows only one signpost 11, one seal tag 12, one handheld unit 17, and one reader 13.

Focusing first on the signpost 11, the signpost 11 is a device of a type known in the art, and is therefore described here only briefly, in order to facilitate an understanding of the present invention. The signpost 11 could be either mobile or stationary, but in the embodiment of FIG. 1 is stationarily mounted, for example on a post or ceiling. The signpost 11 includes a not-illustrated microcontroller. Persons skilled in the art are familiar with the fact that a microcontroller is an integrated circuit which includes a microprocessor, a read only memory (ROM) containing a computer program and static data for the microprocessor, and a random access memory (RAM) in which the microprocessor can store dynamic data during system operation. The signpost 11 also includes a not-illustrated transmitter, which is controlled by the microcontroller, and which transmits a low frequency (LF) signpost signal 22 through an internal antenna.

The transmitter within the signpost 11 generates the signpost signal 22 by effecting amplitude modulation of a carrier signal, which can have a frequency within a range of approximately 30 KHz to 30 MHz. In the disclosed embodiment, and with due regard to compliance with governmental regulations of various countries that relate to electromagnetic emissions, the carrier frequency is selected to be 132 KHz, but could alternatively be some other frequency, such as 13.56 MHz.

A further consideration in the selection of the indicated frequency range is that the signpost signals 22 will exhibit near field characteristics. The localized nature of signals in this frequency range helps to facilitate compliance with governmental regulations in the specific context of the present invention, and also helps minimize reception of these signals by other tags which are in the general vicinity of the signpost 11, but which are beyond an intended transmission range of the signpost signals 22. As known by persons skilled in the art, a signal with near field characteristics has a roll-off which is roughly three times higher than the roll-off for a signal with far field characteristics. Consequently, the signpost signals 22 intentionally have a relatively short transmission range, which in the disclosed embodiment is adjustable and typically about four to twelve feet. Due to the fact that the signpost signals 22 exhibit near field characteristics, the transmission and reception of the signpost signals 22 may be viewed as more of a magnetic coupling between two antennas, rather than a radio frequency coupling.

As shown at 24 in FIG. 1, the signpost 11 is coupled to the control system 14 by a standard RS-232 serial interface. Although the interface 24 is an RS-232 interface, it could alternatively be some other suitable interface, such as an Ethernet interface, an RS-485 interface, or a wireless interface.

Figure 2:
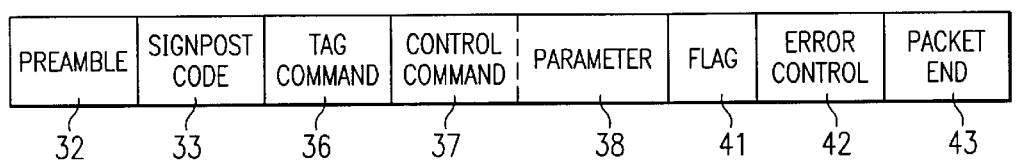
FIG. 2 is a diagrammatic view of a digital word which has several different fields of information and which represents a standardized format for data transmitted by various devices in the apparatus of FIG. 1.

Each signpost signal 22 transmitted by the signpost 11 includes several different elements of information, which will now be discussed in association with FIG. 2. More specifically, FIG. 2 is a diagrammatic view of a digital word 31 having several different fields of information which are discussed below. The bits of the digital word 31 are transmitted in the signpost signal 22 by serially modulating the bits of the word 31 onto the 132 KHz carrier using amplitude modulation, as mentioned above. The bits of the word 31 are transmitted serially, from left to right in FIG. 2.

The first field is a preamble 32, which is a predefined pattern of bits that will allow a device receiving the signal to recognize that the signpost signal is beginning, and to synchronize itself to the signpost signal. In the disclosed embodiment, the preamble is approximately eight bits, but the specific number of bits can vary in dependence on the characteristics of the particular receiver which is expected to be used to receive the signpost signal.

The next field 33 in the word 31 is a signpost code, which in the disclosed embodiment is a 12-bit integer value that uniquely identifies the particular signpost 11 which is transmitting the word 31. As mentioned above, the system 10 may have a number of signposts 11, and the use of different signpost codes 33 by different signposts 11 permits the system to distinguish signpost signals transmitted by one signpost from those transmitted by another.

The next field in the word 31 of FIG. 2 is a tag command 36, which is a command to the seal tag 12 that can affect the operation of the seal tag 12. The tag command field 36 is a 2-bit field. The next two fields in the word 31 are a control command 37 and a parameter 38, which are related. In the disclosed embodiment, the control command 37 is a 4bit field, and the parameter 38 is an 8-bit field. The control command 37 is similar to the tag command 36, to the extent that they each instruct the tag 12 to do something. The difference is that the control command 37 generally requires an accompanying parameter 38, whereas the tag command 36 does not use a parameter. Further discussion of commands is deferred until later, after the tag 12 has been explained in more detail.

In the next field of the word 31 is an extension flag 41, which is a 1-bit field. In the disclosed embodiment, this field is always a binary "0" for the word format 31 of FIG. 2. It is provided for the purpose of facilitating future compatibility. For example, if it became necessary at some future time to modify the format of the word 31, the flag 41 would be set to a binary "1" in each word having the new format, so that a device receiving the signpost signal 22 could determine whether the word 31 received in that signal has the original format shown at 31 in FIG. 2, or the new format.

The next field in word 31 is an error control field 42. Since communications between the signpost 11 and other devices are essentially one-way transmissions, and since many applications for the apparatus 10 of FIG. 1 involve environments that have relatively high noise levels, it is important for a receiving device to be able to evaluate whether the word 31 received in a signpost signal 22 is correct, or whether it has errors. Consequently, the error control field 42 is included to provide a degree of forward error correction (FEC).

In the disclosed embodiment, the error control field 42 includes eight parity bits, but the number of parity bits could be different if the total number of bits in the word 31 is changed, or if a different one of several well-known parities schemes is selected for use. In addition to use of the error control field 42, the overall level of reliability and accuracy could be increased by causing the device which receives the signpost signal 22 to save and compare two successive transmissions of a given signpost signal 22, in order to verify that they are completely identical.

The last field in the word 31 is a packet end field 43. This field signals to a receiving device that a transmission is ending. In the embodiment of FIG. 2, the packet end field 43 has eight bits which are all set to a binary "0".

As mentioned above, the signpost signal 22 is typically transmitted in a relatively noisy environment. In order to ensure reliable signal reception, known techniques may be employed to improve the signal to noise ratio (SNR). In the disclosed embodiment of FIG. 1, the amplitude modulation of the 132 KHz carrier is effected using the well-known technique of amplitude shift keying (ASK), in order to improve the SNR. Other techniques could alternatively be used to improve the SNR, such as frequency shift keying (FSK) or phase shift keying (PSK).

As noted above, communications between the signpost 11 and the seal tag 12 are one-way communications involving the signpost signals 22. With this in mind, it is desirable to provide a degree of security that ensures the field tag 12 will react only to valid signpost signals 22, especially with respect to the commands in fields 36–38. Therefore, some or all of the fields 33, 36–38 and 41 can be subjected to security protection using well-know encryption techniques, or alternatively using well-known password techniques.

Figure 3:
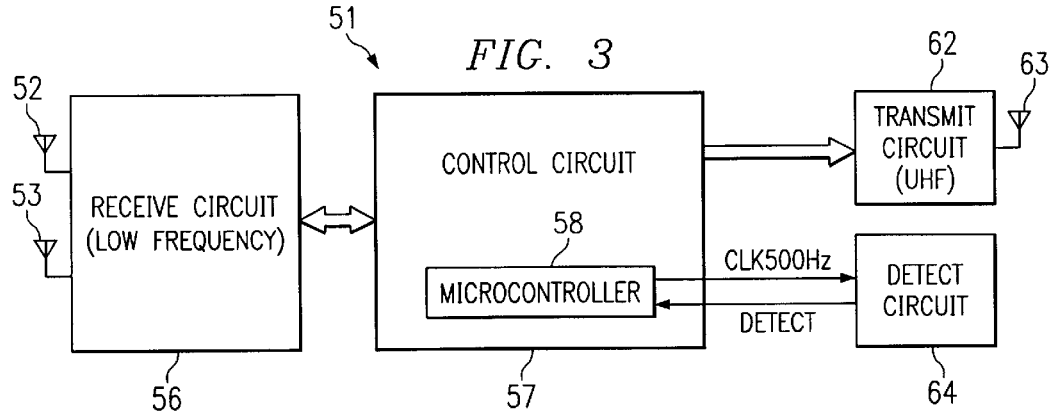
FIG. 3 is a block diagram of circuitry within a seal tag which is a component of the apparatus of FIG. 1.

Turning to the seal tag 12, FIG. 3 is a block diagram of the circuitry 51 of the seal tag 12. This circuitry operates on power from a not-illustrated battery, which is provided within the seal tag 12. The circuitry 51 includes two receive antennas 52 and 53, a receive circuit 56, a control circuit 57 having a microcontroller 58, a transmit circuit 62, a transmit antenna 63, and a detect circuit 64. The detect circuit 64 is also shown diagrammatically in FIG. 1, using broken lines. The circuitry 51 is a type of circuit used in pre-existing tags, except for the detect circuit 64, two signals CLK500HZ and DETECT that couple the detect circuit 64 to the microcontroller 58, and certain portions of the firmware (control program) for the microcontroller 58. The circuitry within the detect circuit 64 will be described in detail later, along with related portions of the firmware in the microcontroller 58. First, however, portions of the circuitry 51 which are known will now be described briefly, to an extent which facilitates an understanding of the present invention.

More specifically, the two receive antennas 52 and 53 are oriented at a right angle to each other, in order to facilitate better reception of signals such as the signpost signals shown at 22 in FIG. 1. The receive circuit 56 processes the signals from each of these antennas 52 and 53, and then sums the signals so that the stronger signal will essentially dominate. The resulting signal is then passed on to the microcontroller 58 in the control circuit 57.

The transmit circuit 62 is an ultra high frequency (UHF) transmitter, which transmits through the transmit antenna 63, using a carrier signal having a frequency of 433.92 MHz. Using the transmit circuit 62 and antenna 63, the microcontroller 58 of the tag 12 can transmit beacon signals 71 (FIG. 1) to devices such as the reader 13 and the handheld unit 17. The beacon signals 71 are generated by FSK modulation of certain beacon information on to onto the 433.92 MHz carrier signal. The frequency of 433.92 MHz is used in the disclosed embodiment because it is available for use in a relatively wide number of countries under prevailing governmental regulations regarding transmission of electromagnetic signals. However, other frequencies could alternatively be used, such 915 MHz. The transmission range for the beacon signals 71 is substantially longer than that for the signpost signals 22, and in the disclosed embodiment can be up to about 300 feet. The beacon signals 71 are transmitted using a technique known in the art as a slotted aloha protocol, in order to reduce interference between beacon signals transmitted by different tags.

In the disclosed embodiment, the beacon information transmitted in the beacon signals 71 may take one of two different forms, both of which are shown in FIG. 4. More specifically, if the seal tag 12 has received a valid signpost signal 22 through the antennas 52–53 and the receive circuit 56, the beacon information transmitted in the beacon signal 71 will have the word format shown at 76 in FIG. 4. In contrast, during periods of time when the seal tag 12 is not receiving signpost signals from other devices, the beacon information transmitted in the signal 71 will have the word format shown at 77 in FIG. 4. Regardless of which word format 76 or 77 is currently being used, the disclosed embodiment will transmit the information in the word using Manchester encoded FSK modulation at 27.7 Kbps.

The word format 76 will be discussed first. It begins with a preamble 81, which is functionally comparable to the preamble 32 of the word 31 (FIG. 2). In the disclosed embodiment, the preamble 81 lasts 1,296 microseconds, and includes 20 cycles which each include a 30 microsecond logic high and a 30 microsecond logic low, followed by one cycle which includes a 42 microsecond logic high and a 54 microsecond logic low. The next field in the word 76 is a 1-bit format field 82, which is provided to indicate to a receiving device which of the two formats 81 and 82 in FIG. 4 is the format used for the instant beacon signal. Thus, the field 82 is always a binary "1" in word 76, and is always a binary "0" in word 77.

The next field in the word 76 is a 4-bit tag type field 83, which is a code that provides some information regarding how the particular tag 12 is being used in the system. This type field in the seal tags 12 may indicate that the seal tag 12 is being used to monitor the lock 19 on the container 18, whereas the tag type fields for other tags may have different codes, for example indicating that the tag is being used with some form of mobile device or is stationarily mounted on some fixed object. In the disclosed embodiment, the tag type code 83 could also provide some information about the container 18, such as its volume or its height.

The next field in the word 76 is a 3-bit asset type field 84. The field 84 can identify more specifically the particular type of device with which the tag 12 is associated. While the tag 12 in the disclosed embodiment is associated with a container 18, other tag devices which are transmitting similar beacon signals will be attached to other types of devices, and would therefore have different codes in the field 84.

The next field in the word 76 is a beacon code 86. In the disclosed embodiment, this is an integer value which uniquely identifies the particular tag that is transmitting the word 76. As mentioned above, the apparatus 10 may have a number of different tags, and the use of a different beacon code 86 for each tag permits the system to distinguish beacon signals transmitted by one tag from those transmitted by another.

The next field in the word 76 is a seal status bit 87, which is a 1-bit field that indicates the current status of the lock 19 (FIG. 1), in a manner described in more detail later. The next field is a seal event code 88, which is a 4-bit field used in association with monitoring of the lock 19, in a manner described in more detail later.

The next field in the word 76 is a signpost code 91. This is identically the signpost code extracted at 33 from the signpost word 31 which was most recently received by the seal tag 12. The next field in the word 76 is a last command field 92, which is identically the code for the last command which was received in either of the fields 37 or 38 of the signpost word 31 received from the signpost having the signpost code which is present in the field 91.

The next field in the word 76 is an error control field 93. In the disclosed embodiment, this is a 16-bit field using a cyclic redundancy code (CRC) of a known type, which is calculated using the information in fields 82–84, 86–88 and 91–92. The beacon signals 71 transmitted by the tag 12 are essentially one-way signals, and the error control field 94 is therefore provided so that a device which receives these signals will have a degree of capability to detect and correct some errors in a received word 76. The receiving device can also increase accuracy and reliability by receiving and comparing two successive beacon signals 71 in order to verify that they are identical. The last field in the word 76 is a packet end field 94, which in the disclosed embodiment is a logic low of 36 microseconds. The packet end field 94 indicates to a receiving device that the field 94 is the end of the word 76 which is currently being received.

Turning to the alternative format 77 of the beacon word, the basic difference from the word 76 is that the fields 91 and 92 of the word 76 are omitted from the word 77. This is because the fields 91 and 92 contain information extracted from the last received signpost word 31. In contrast, as mentioned above, the beacon word 77 is used in situations where the tag 12 is not currently receiving any signpost signals, and thus has no current information to put into the fields 91 and 92. Therefore, the fields 91 and 92 are omitted in word format 77.

In theory, it would be possible to use the word format 76 even when the tag 12 is not currently receiving information from any signpost, and to simply put a "dummy" code such as all zeros into each of the fields 91 and 92. However, governmental regulations regarding radio transmissions tend to involve a balancing between factors such as the power level at which a beacon signal 71 is transmitted, the time interval between successive transmissions of beacon signals 71, and the amount of information present in each beacon signal. By using the word format 77 when the fields 91 and 92 are not needed, the duration of the transmission of the beacon signal 71 is reduced, which in turn facilitates compliance with governmental regulations.

There are two other differences between the word format 77 and the word format 76. First, the field 82 is always a binary "1" in word 76, and a binary "0" in the word 77, as discussed above. Second, the CRC value used in the error control field 93 of word 77 is calculated using only fields 82–84 and 86–88, because the fields 91 and 92 are not present, and thus cannot be taken into account.

The rate at which the tag 12 transmits the beacon signals 71 will vary under different operational circumstances. For example, when the tag 12 is receiving signpost signals or is subject to some other stimulus to transmit, the tag 12 will transmit beacon signals 71 more frequently. In contrast, in other operational circumstances, the tag will transmit beacon signals 71 less frequently. In either case, the exact time intervals between successive transmissions of the beacon signals are varied with degree of randomness, to decrease the likelihood of recurring "collisions" between beacon signals from different tags. The variations in the rate and timing of the transmission of beacon signals 71 by the tag 12 conform to known techniques, and are therefore not described here in further detail.

Since the circuitry 51 includes all capability of certain pre-existing tags, the tag 12 has full capability of a known type to facilitate tracking of the movement of assets such as the container 18. Since that type of capability is well-known, it is not described here in detail.

Referring again to FIG. 1, the reader 13 is a stationarily mounted device of a type which is known in the art, and is therefore described here only briefly. The reader 13 receives the UHF beacon signals 71 transmitted by the seal tag 12, and then forwards the beacon word (FIG. 4) from each received beacon signal on to the control system 14, through a network 101. In the disclosed embodiment, the network 101 is a type of network referred to in the art as an Ethernet network, but it could alternatively be some other form of network.

The wireless base station 16 is a device of a type known in the art, and is coupled to the control system 14 through a network 106. In the disclosed embodiment, the network 106 is an Ethernet network, but it could alternatively be some other type of network. Further, it would alternatively be possible to use a single network to implement both the network 101 and the network 106.

The wireless handheld unit 17 includes a keypad 111 with a plurality of manually operable push buttons, and a display 112 which is a liquid crystal display (LCD). The handheld unit 17 is portable, and operates on battery power. The handheld unit 17 includes not-illustrated circuitry containing a microcontroller. This circuitry can receive the beacon signals 71 transmitted by the tag 12, use radio frequency (RF) signals 116 for bi-directional communications with the control system 14 through base station 16 and network 106, and transmit low frequency signpost signals 118 which are similar to the signpost signals 22, and which conform to the word format shown in FIG. 2. The use of the handheld unit 17 will be discussed in more detail later.

Turning now in more detail to the seal tag 12, FIG. 5 is a diagrammatic perspective view of the tag 12, and also shows the lock 19 which is used to secure the container 18. FIG. 6 is a diagrammatic end view of the tag 12 and lock 19, and also shows in cross section two elements 151 and 152, which are part of a latching mechanism on the container 18. In the disclosed embodiment, the container 18 is an intermodal container of a known type,.which is relatively large. A number of these containers may be loaded onto a ship or a plane, and are configured to stack neatly with each other. The container 18 includes a housing with an opening providing access to an interior region of the housing, and includes an access door which can move between open and closed positions in which access through the opening is respectively permitted and obstructed.

The container includes a latch mechanism that can keep the container door in its closed position, and this latch mechanism includes the elements 151 and 152. In FIG. 6, the element 152 is provided on the housing of the container, and the element 151 is provided on the door of the container. When the door is closed, the elements 151 and 152 are in the position shown in FIG. 6. In order to open the door, the element 151 must move relative to the element 152. The elements 151 and 152 have cylindrical openings 153 and 154, which are coaxially aligned with each other when the container door is closed and the elements 151 and 152 are in the position shown in FIG. 6. The openings 153 and 154 are not aligned when the container door is open. The configuration of the elements 151 and 152 shown in FIG. 6 represents only one possible configuration. There are a variety of configurations of the elements 151 and 152 with which the present invention would be compatible.

The seal or lock 19 is a type of device which is commercially available and well known in the art. It includes a bolt 161 and a housing 162. The bolt 161 has a cylindrical shank 166, with an enlarged head 167 at the upper end. The lower end of the shank 166 has been inserted into the housing 162, and structure within the housing 162 lockingly grips the end of the shank 166 in a manner that prevents withdrawal of the shank from the housing 162 without either destroying the housing 162 or cutting the shank 166. The intent of the design is that, tin order to open the lock 19, the shank 166 of the bolt must be physically cut. The housing 162 may have not-illustrated indicia provided thereon, in the form of a unique identifier for each housing 162. Where the housing 162 includes such indicia, the indicia can be recorded in order to help detect and reduce tampering.

As shown in FIGS. 5 and 6, the seal tag 12 includes a housing formed by two parts 201 and 202. In the disclosed embodiment, the housing parts 201 and 202 are each made from a very sturdy plastic, and are fixedly secured to each other by ultrasonic welding. However, they could alternatively be made from some other type of material, and could be secured together in some other fashion. The housing defined by the parts 201–202 contains a (not-illustrated) circuit board which carries essentially all of the circuitry shown at 51 in FIG. 3, except for two wire coils which are discussed in more detail later. The tag 12 also includes an arm 211 which has one end securely anchored within the housing defined by the parts 201 and 202, and which projects outwardly through an opening in the housing part 201, the opening being surrounded by an annular collar 213 which is an integral portion of the housing part 201. The outer end of the arm 211 is approximately U-shaped, and has two spaced legs 216 and 217 coupled by a bight 218. The legs 216 and 217 have aligned openings through which the shank 166 of the bolt 161 extends.

Figure 7:
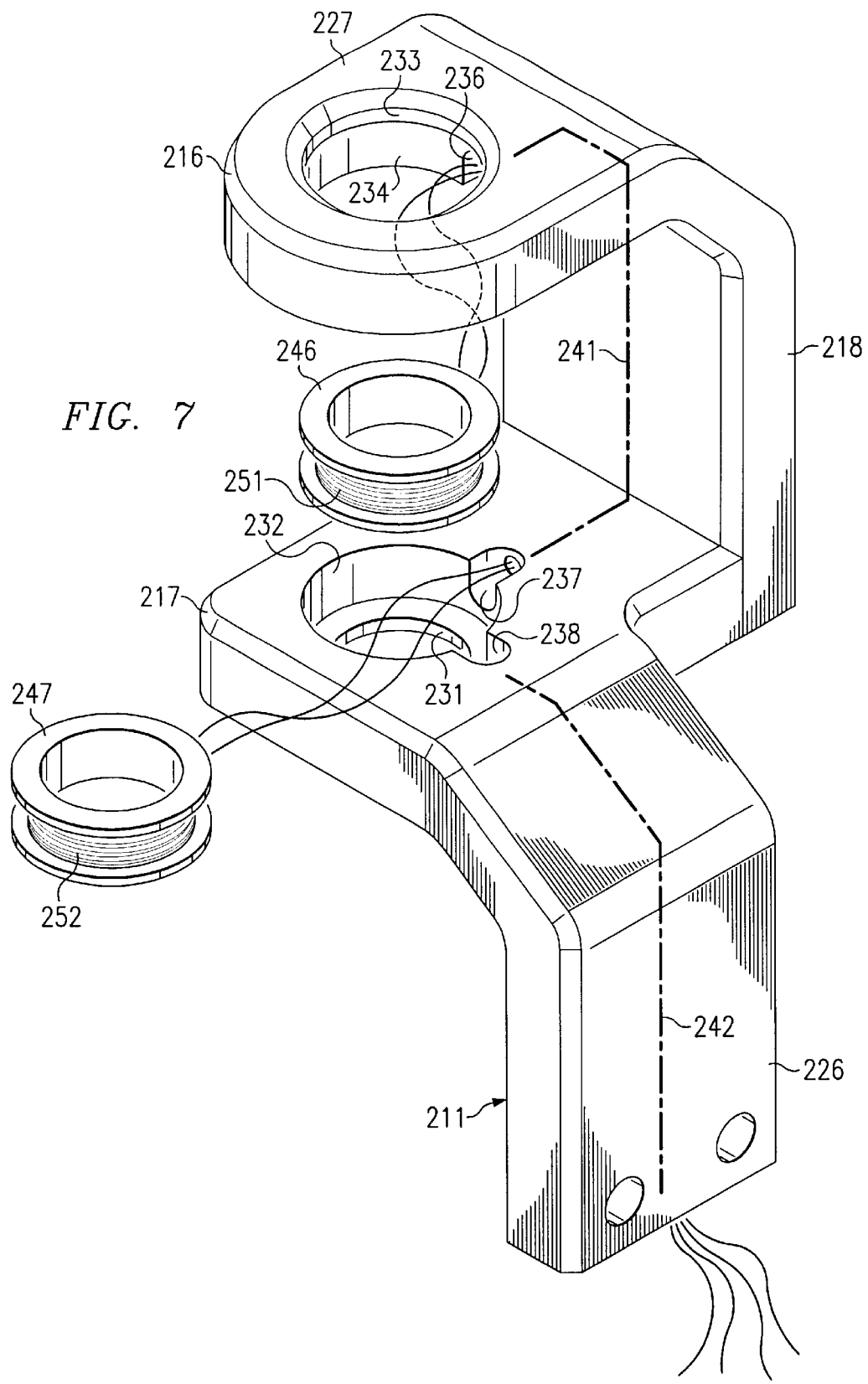
FIG. 7 is a diagrammatic exploded perspective view of an arm which is part of the seal tag of FIG. 1.

FIG. 7 is a diagrammatic exploded perspective view of the arm 211, showing additional details of the arm. The arm 211 includes two bent, platelike parts 226 and 227. In the disclosed embodiment, the parts 226 and 227 are each made from stainless steel, but they could alternatively be made from some other type of material, such as a robust plastic. The part 227 includes the leg 216 and the bight 218, and the part 226 includes the remainder of the arm 211. The parts 226 and 227 are fixedly welded to each other at a right angle, at the intersection of the bight 218 and the leg 217.

The arm 217 of the part 226 has a cylindrical hole 231 which extends vertically through it, and a cylindrical counterbore 232 of larger diameter is provided in the upper side of the arm 217, coaxial with the hole 231. A similar hole 233 and counterbore 234 are provided in the leg 216 of the part 227, in a manner so that they are coaxial with each other, and with the hole 231 and counterbore 232.

A recess 236 is machined in one edge of the counterbore 234, and two similar recesses 237 and 238 are machined in the edge of counterbore 232 at circumferentially spaced locations. As indicated diagrammatically by a broken line 241, a bore extends from the recess 236 through the arm 216, bight 218 and arm 217 to the recess 237. Similarly, as indicated diagrammatically by a broken line 242, a bore extends from the recess 238 through the part 226 to the lower end of the part 226. The bores 241 and 242 are formed by drilling holes in the parts 226 and 227 before these parts are bent into the shapes shown in FIG. 7.

The arm 211 also includes two bobbins 246 and 247. The bobbins each have an outside diameter which is approximately equal to the diameter of the counterbores 232 and 234, and each have an inside diameter which is approximately equal to the diameter of the holes 231 and 233. In an axial direction, the bobbins 246 and 247 have heights which are approximately equal to the depths of the counterbores 232 and 234. The bobbin 246 is received in the counterbore 234, and the bobbin 247 is received in the counterbore 232. The bobbins 246 and 247 are each made from stainless steel, and are formed to have a press fit within the counterbores 233 and 234. The bobbins are secured within the counterbores 233 and 234 by a suitable known adhesive. The bobbins could alternatively be made from some other material, such as a robust plastic, and could be secured in place by some other technique. For example, if the arm and the bobbins were all made of a plastic material, the bobbins could be seam welded to the arm.

The bobbin 246 has a coil 251 of wire wrapped around it, and the two end portions of this wire extend through the bore 241 and the bore 242 to the interior of the tag 12, where they are coupled to the circuitry on the not-illustrated circuit board. Similarly, the bobbin 247 has a coil 252 of wire, and the end portions of this wire extend through the bore 242 to interior of the tag 12, where they are coupled to the circuitry on the not-illustrated circuit board. It will be recognized that the metal shank 166 of the bolt 161 extends through each of the bobbins 246 and 247, such that the coils 251 and 252 each circle the shank 166 at axially spaced locations therealong. Further, with reference to FIGS. 6 and 7, it will be noted that the elements 151 and 152 of the latch mechanism are each located between the coils 251 and 252.

Figure 8:
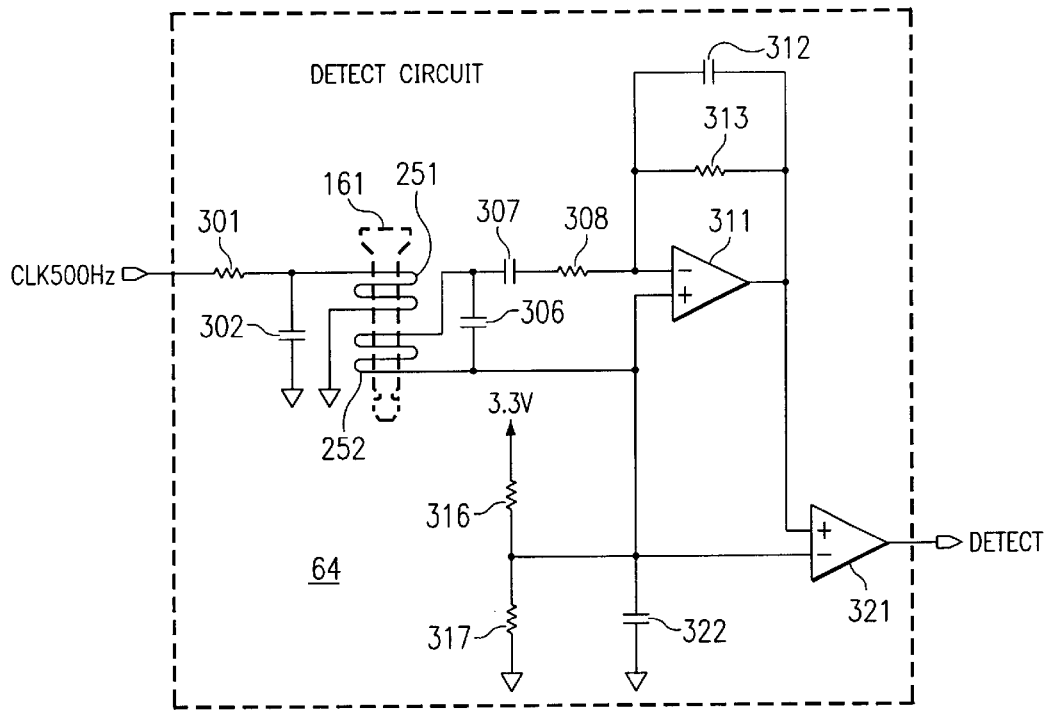
FIG. 8 is a circuit schematic showing a detect circuit which is part of the circuitry in the seal tag of FIG. 1.

The coils 251 and 252 are part of the detect circuit 64 discussed above in association with FIGS. 1 and 3. The detect circuit 64 is shown in detail in FIG. 8, which is a circuit schematic. Although the bolt 161 is not part of the detect circuit 64, it is shown in broken lines in FIG. 8 in order to facilitate an understanding of the operation of the detect circuit 64. FIG. 8 shows the coils 251 and 252 encircling the shank of the bolt 161, at axially spaced locations. The signal CLK500 HZ is generated by the microcontroller 58 (FIG. 3) in the control circuit 57. In the detect circuit 64, this signal is coupled through a resistor 301 to one end of the coil 251, the other end of the coil 251 being coupled to ground. A capacitor 302 is coupled between ground and the node between the resistor 301 and the coil 251.

The coil 252 has one end coupled to a plus input of an amplifier 311, and has its other end coupled to one end of a capacitor 306 and one end of a capacitor 307. The other end of the capacitor 306 is coupled to the plus input of the amplifier 311, and the other end of the capacitor 307 is coupled through a resistor 308 to the minus input of the amplifier 311. A capacitor 312 is coupled between the output and the minus input of the amplifier 311, and a resistor 313 is coupled in parallel with the capacitor 312. The capacitor 312 and the resistor 313 provide feedback for the amplifier 311.

Two resistors 316 and 317 are coupled in series between a supply voltage and ground, and the node between them is coupled to the plus input of the amplifier 311 and the minus input of an amplifier 321 which functions as a comparator. A capacitor 322 is coupled between ground and the minus input of the comparator 321. The output of the amplifier 311 is coupled to the plus input of the comparator 321. The output of the comparator 321 serves as the DETECT output from the detect circuit 64, which is coupled to the microcontroller 58 (FIG. 3).

The input signal CLK500 HZ for the detect circuit 64 is generated by the microcontroller 58 as a burst of ten square-wave pulses at a frequency of 500 Hz with a 50% duty cycle. The capacitor 302 serves as a form of low pass filter, which rounds the edges of the square wave so that each pulse of the waveform applied to the coil 251 looks somewhat like part of a sine curve, although not conforming precisely to a sine curve. This pulse signal causes coil 251 to generate a varying magnetic field. If the metal bolt 161 is present, the magnetic field will act through the bolt to induce a signal in the coil 252. In the absence of the bolt 161, the magnetic field generated by coil 251 is not strong enough to induce any significant signal in the coil 252.

When the bolt 161 is present, the flux of the varying magnetic field induces a signal in the coil 252, which is supplied through an AC coupling capacitor 307 and a resistor 308 to the minus input of amplifier 311. The capacitor 306 serves as a low pass filter that removes any high frequency noise which may be picked up by the coil 252, such as RF signals.

The amplifier 311 amplifies the signal detected by the coil 252, and supplies it to the plus input of the comparator 321. Resistors 316 and 317 form a voltage divider, which maintains the minus input of the comparator 321 at a predetermined voltage. The comparator 321 therefore functions as a form of threshold detector, which produces an output when a magnetic pulse detected by the coil 252 produces an output pulse from the amplifier 311 which exceeds the voltage from the voltage divider 316–317. This then causes the comparator 321 to produce a pulse at its output when the threshold is exceeded. The circuit is configured so that the comparator 321 will be driven into saturation in response to a pulse at the output of the amplifier 311, thereby clipping the peaks of the rounded pulses produced at the output of amplifier 311, so that the DETECT signal will be approximately a square wave.

Figure 9:
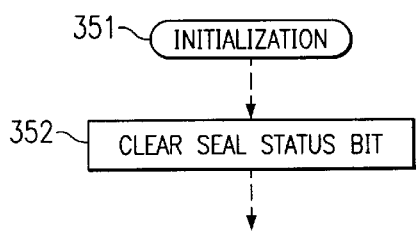

With reference to FIG. 3, the manner in which the microcontroller 58 of the controller 57 operates the detect circuit 64 will be discussed in more detail with reference to FIGS. 9–11, which are each a flowchart showing a respective portion of a firmware program executed by the microcontroller 58. FIG. 9 depicts an initialization routine, which is executed relatively infrequently, for example when a new battery is installed in the tag 12. The tag 12 may then well operate for several years without executing the initialization routine again. Various operations occur during the initialization routine of FIG. 9, but at some point in this routine, with reference to block 252, the microcontroller 58 initializes the seal status bit which it maintains within its internal memory, by clearing this bit to a binary "0". This is the seal status bit which is transmitted at 87 (FIG. 4) in the beacon signals 71.

Figure 10:
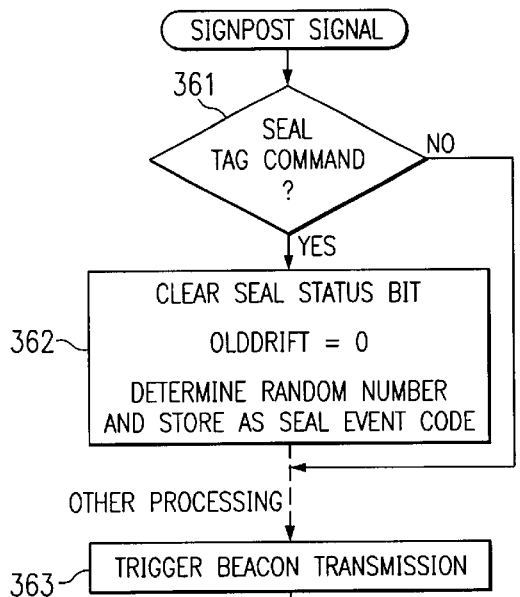

FIG. 10 shows a routine which is executed by the microcontroller 58 when the tag 12 receives a signpost signal, for example one of the signpost signals shown at 22 or 118 in FIG. 1. At block 361, the microcontroller 58 inspects the tag commands 36–37 (FIG. 2) in the received signpost signal 31, in order to determine whether the signpost signal includes a particular type of command, which is a command that tells the tag 12 to begin monitoring the seal or lock 19 installed on the container 18. If the signpost signal does not include this particular command, then block 362 is skipped.

Otherwise, at block 362, the microcontroller 58 carries out the command by clearing the seal status bit which it maintains in its memory so that the bit is a binary "0". In essence, the tag 12 is instructed to assume that the bolt 161 is present and that the container is validly sealed or locked. The tag validates this assumption in a subsequent step, as discussed later. In block 362, the microcontroller also sets an internal variable OLDDRIFT to be zero. Thereafter, the microcontroller 58 determines a random number using a well-known technique, and stores this random number in its memory as the seal event code. This is the same seal event code discussed above in association with the field 88 (FIG. 4) in the beacon signals 71. The seal event code may be determined using a known technique which produces a true random number, or alternatively by using a known technique which produces a pseudo-random number. The seal event code facilitates detection of a situation in which the lock 19 has been tampered with, in a manner discussed later.

Following block 262, the microcontroller 258 performs other processing which does not need to be described in detail here, such as check for other types of commands. In due course, it reaches block 363, where it triggers transmissions of the beacon signal 71. These beacon signals will, of course, conform to one of the formats shown in FIG. 4, and will thus include at 87 and 88 the seal status bit and seal event code from the memory of the microcontroller 58. The routine of FIG. 10 then ends.

FIG. 11 is a flowchart showing a routine which is executed once per second by the microcontroller 58. Entry to the routine of FIG. 11 is effected in response to a timer, either in the form of a hardware real time clock (RTC) interrupt, a hardware timer maintained by the firmware, or in the form of periodic software polling of a timer to detect its expiration. At block 371, the microcontroller 58 initiates a sequence which supplies a burst of ten square-wave pulses to the CLK500 HZ line at a frequency of 500 Hz with a 50% duty cycle. If the metal bolt 161 is present, then as discussed above in association in FIG. 8, this will cause a corresponding burst of ten pulses to be electromagnetically induced in the coil 252, which in turn will cause a burst of ten pulses to be supplied to the DETECT line running from the detect circuit 64 back to the microcontroller 58. On the other hand, if the bolt 161 is not present, no significant signal will be electromagnetically induced in the coil 252, and no pulses will be supplied to the DETECT line.

Control then proceeds to block 372. In block 372, the microcontroller 58 monitors the DETECT line for the first of the ten pulses expected there. If no pulse is received within a reasonable time interval, for example because the bolt 161 is not present within the coils 251 and 252, then the microcontroller 58 assumes that there is some problem with the integrity of the seal or lock 19, and control proceeds to block 376. In block 376, the microcontroller sets the seal status bit to a binary "1", and triggers a beacon transmission. This will cause the transmission of beacon signals 71 in which the seal status bit 87 (FIG. 4) is a binary "1". Any device within the vicinity of the tag 12 which is receiving these beacon signals 71 can detect the fact that the seal status bit is a binary "1", and will thus know that the integrity of the seal or lock has been compromised. For example, with reference to FIG. 1, if the tag 12 is in the vicinity of the reader 13, the control system 14 will receive prompt notice that the seal or lock 19 for the container 18 has been compromised. From block 376, control proceeds to block 377, where the routine of FIG. 11 ends.

Referring again to block 372 in FIG. 11, assume that the microcontroller receives the first of the ten pulses expected on the DETECT line. The microcontroller sets this first pulse aside, and then proceeds to block 373. In block 373, for each of the next nine pulses received on the DETECT line, the microcontroller 58 determines the time interval between the rising edge of each such pulse on the line CLK500 KZ, and the rising edge of the corresponding pulse induced on the DETECT line. In essence, each such time interval represents a phase shift between a pulse on the line CLK500 HZ and a corresponding pulse on the DETECT line. Although the disclosed embodiment looks for variations in the phase shift between corresponding pulses on the two lines, it would alternatively be possible to look at some other characteristic, such as variations in signal amplitude.

From block 373, control proceeds to block 374, where the microcontroller 58 checks to see whether it received all of the ten pulses that it expected on the DETECT line. If it did not, then the microcontroller 58 assumes there is some problem with the integrity of the seal or lock 19. Control proceeds from block 374 to block 376, where the microcontroller sets the seal status bit to a binary "1", and triggers a beacon transmission, in the manner already described above.

Referring again to block 374, assume that the microcontroller determined that all ten of the pulses expected on the DETECT line were received. Control will proceed from block 374 to block 378, where the microcontroller 58 sums the nine time intervals determined in block 373, and then puts the sum into a variable called NEWDRIFT. Next, at block 381, the microcontroller 58 checks to see whether the variable OLDDRIFT contains the value zero. If so, it means that this is the first time the routine 11 has been executed since block 362 was executed in the routine of FIG. 10. In that case, blocks 382 and 383 are skipped, and control proceeds directly to block 386, where the variable OLDDRIFT is set to contain the same value which was calculated at block 378 for NEWDRIFT. The routine of FIG. 11 is then exited at block 377.

On the other hand, assuming it is determined at block 381 that OLDDRIFT has a value other than zero, which would typically be the case during normal operation, control proceeds from block 381 to block 382. In block 382, the microcontroller 58 calculates the absolute value of the difference between NEWDRIFT and OLDDRIFT, and places this value in a variable called CHANGE. In effect, the microcontroller is comparing two successive values calculated for NEWDRIFT, the older of which is in OLDDRIFT. Then, at block 383, the microcontroller 58 checks to see whether the value in CHANGE is greater than 305 microseconds. As long as the integrity of the lock 19 remains intact, the magnetic flux characteristic in the region of coils 251 and 252 should remain about the same, and the detect circuit 64 should produce approximately the same signal on the DETECT line each time the microcontroller 58 generates its standard pulse burst on the line CLK500 HZ. Consequently, the value of NEWDRIFT calculated in block 378 should typically be about the same for each successive burst of pulses, and immediately successive calculations of NEWDRIFT will normally be within 305 microseconds of each other. If so, it is interpreted to mean that the seal or lock 19 is still intact, and control proceeds from block 383 to block 386, where OLDDRIFT is set to equal NEWDRIFT, and the routine ends at block 377.

Referring again to block 383, if it is determined in block 383 that two successive calculations of NEWDRIFT differ by more than 305 microseconds, this is assumed to mean that the metal bolt 161 of the lock has been removed or compromised, thereby causing a significant change in the magnetic flux characteristic, which in turn affects the phase difference between the pulses of the signals CLK500 HZ and DETECT. Control then proceeds from block 383 to block 376, where the microcontroller 58 sets the seal status bit to a binary "1" in order to indicate the lock has been compromised, and then triggers transmission of beacon signals.

Figure 12:
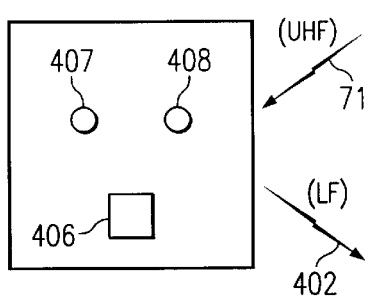
FIG. 12 is a diagrammatic view of a miniature reader that can be used in association with the apparatus of FIG. 1.

FIG. 12 is a diagrammatic view of a miniature reader 401, which is a portable, battery-operated device that can be optionally used in association with the system 10 of FIG. 1. The reader 401 can transmit low frequency signals 402 which are similar to the signpost signals 22 and 118 discussed above, and which conform to the word format shown in FIG. 2. Further, the miniature reader 401 can receive the UHF beacon signals 71 transmitted by the tag 12.

The miniature reader 401 has a size and configuration which are somewhat similar to the devices used for keyless entry to automobiles. It includes a manually operable push button 406, a green light emitting diode (LED) 407 and a red LED 408. When the button 406 is pressed, the miniature reader 401 transmits a signpost signal 402, which causes the tag 12 to transmit beacon signals 71 (if the tag is not already doing so). The miniature reader 401 then receives the transmitted beacon signal 71, and checks the seal status bit 87 (FIG. 4) in the received signal. The reader 401 turns on the green LED 407 if the seal status bit is a binary "0" (indicating that the lock is intact), or turns on the red LED 408 if the seal status bit is a binary "1" (indicating that there is currently no lock which is considered to be intact). The miniature reader does not have all of the capabilities of the handheld unit 17 (FIG. 1), and in particular does not have the capability to reset a tag by sending a seal tag command of the type discussed above in association with handheld unit 17 and blocks 361 and 362 in FIG. 10.

A brief explanation will now be provided of one example of the operation of the system 10 shown in FIG. 1. The container 18 is loaded with items to be shipped, and the door of the container is then closed, so that the openings 153 and 154 in the elements 151–152 of the container's latch mechanism move into alignment. The seal tag 12 is then positioned so that the openings in the arm 211 thereof are aligned with the openings 153–154 in the latch elements 151 and 152, and then the shank 166 of the bolt 161 of the lock 19 is inserted through all of the aligned openings, and then the end of the shank 166 is pressed into the housing 162. The result at this point will be the configuration shown in FIG. 6.

A human operator then uses the keypad 111 of the handheld unit 17 to send the seal tag 12 a signpost signal 118 which includes a command notifying the seal tag 12 that a seal or lock is in place and should be monitored. The seal tag 12 responds in the manner described above in association with block 362 of FIG. 10. This includes clearing the seal status bit, and also randomly or pseudo-randomly determining a number which is stored as the seal event code. Then, as discussed with respect to block 363, the seal tag 12 transmits beacon signals 71 which include this seal status bit and seal event code.

These beacon signals 71 are detected by the reader 13, and forwarded to the control system 14. The control system 14 saves in a not-illustrated database record both the unique beacon code 86 (FIG. 4) which identifies the particular seal tag 12, and also the random seal event code 88 determined by the seal tag 12, along with other information relating to the container 18, such as a manifest of the items in container 18, an identification number for the person who used the handheld unit 17 to implement the seal, an identification number of a driver of a vehicle carrying the container, and/or an identification number for the particular container. In this regard, it is possible for the operator of the handheld unit 17 to use the unit 17 to enter some or all of this information. This information may be entered manually using the keypad 111. Alternatively, the unit 17 may be provided with a not-illustrated bar code reader, which can be used to scan bar codes provided on the tag 12, on the container 18, on an identification badge of the operator, on an identification badge of the driver, and so forth.

The container 18, with the lock 19 and seal tag 12 coupled to it, are then shipped. Assume that the integrity of the block 19 is not compromised, and the container 18 arrives at its destination. The destination will include a system with a configuration similar to that shown in FIG. 1. A signpost 11 operated by the control system 14 will produce signpost signals 22 that cause the seal tag 12 to generate beacon signals 71, which will be detected by the reader 13 and supplied through the network 101 to the control system 14. The seal status bit received in the beacon signal from the seal tag 12 should be a binary "0", indicating that the seal or lock is intact. In contrast, if this bit is a binary "1", then the control system 14 knows that the seal or lock 19 has been compromised.

The control system 14 at the destination will also have the capability to use a telecommunications link or other suitable technique to access the database record created regarding the container 18 by the equivalent control system 14 at the point of origin of the shipment. The control system 14 at the destination can thus compare the beacon code 86 (FIG. 4) and the seal event code 88 read directly from the seal tag 12 with the corresponding entries in the database record from the point of origin of the shipment. They should be unchanged. If one or both are different, then the control system 14 at the destination knows that the seal or lock 19 has been compromised.

In this regard, assume that someone tampers with the lock 19 at some point during the shipment, for example by cutting the bolt 161 and removing the lock 19. This will cause the seal tag 12 to detect the missing lock, change the state of the seal status bit to a binary "1", and transmit beacon signals containing the modified bit, in the manner discussed above in association with blocks 371–372 and 376 in FIG. 11. If the seal tag 12 is within range of any device that can receive its beacon signals 71, such as a reader 13, the control system associated with that device will receive immediate notification that there is a problem, and could notify someone such as a security guard to take appropriate action.

Assume, however, that the seal tag 12 does not happen to be within the range of any device which could receive its beacon signals 71 at the time that the seal or lock 19 is compromised. For example the container with the seal tag 12 may be on a truck traveling along a highway, or may be on a ship in the middle of the ocean. The seal tag 12 will be transmitting beacon signals 71 indicating that it has detected a problem, but those signals will not be received. Assume that the person then replaces the destroyed lock 19 with a virtually identical new lock, and then uses a handheld unit 17 to send a signpost signal 118 which tells the seal tag 12 that a seal or lock is intact and that it should begin monitoring the seal or lock. This will cause the seal tag 12 to clear its seal status bit, as discussed above in association with block 362 in FIG. 10. This means that the seal status bit will provide no indication that the container has been tampered with.

On the other hand, the seal tag 12 will also automatically determine and save a new random or pseudorandom number to serve as its seal event code, as discussed above in association with block 362. As a result, when the container 18 reaches its destination, the seal event code 88 (FIG. 4) which is obtained directly from the tag 12 at the destination will be different from the seal event code which was obtained from that tag 12 at the point of origin for storage in the database record associated with container 18. Therefore, when the control system 14 at the destination compares the seal event code obtained from the tag 12 with the seal event code from the database, it will detect that they are different and thus that the lock 19 was compromised during shipment, even though the lock 19 has been replaced with an effectively identical lock.

It will also be recognized that, if the person tampering with the lock 19 replaces not only the lock but also the seal tag, the new seal tag will contain a seal event code different from that in the original seal tag, regardless of whether or not the person has a device like the handheld unit 17 which has the capability to electronically reset the tag. In either case, the fact that seal tag has been replaced can be detected when the container reaches its destination and the discrepancy in the seal event codes is detected. And if the person does not have a device capable of electronically resetting the tag, the seal status bit will be a binary "1", such that the tampering may be detected even sooner.

At any time during the shipment, a person in close proximity to the container 18 can use a miniature reader, such as that shown at 401 in FIG. 12, for the purpose of interrogating the tag 12 and determining the state of its seal status bit. In particular, the person presses the button 406 and looks to see if the reader 401 turns on the green LED 407 or the red LED 408. Activation of the green LED 407 means that the tag 12 believes the lock 19 remains uncompromised, whereas activation of the red LED 408 means that the tag 12 believes the lock 19 has been compromised. This permits detection of a situation where the lock 19 has been removed and replaced with an identical lock, but where the person who tampered with the lock did not have a device like the handheld unit 17 which is capable of electronically resetting the tag 12 in the manner discussed above in association with block 362 in FIG. 10.

The miniature reader 401 would not be capable of detecting a situation in which the individual tampering with the lock had a device capable of electronically resetting the seal tag 12. This is because the miniature reader 401 does not have the capability to access the seal event code 88 (FIG. 4) stored in the database record created at the point of origin of the shipment, and thus cannot compare that seal event code to the seal event code being transmitted by the tag 12 in its beacon signals. Of course, this higher level of tampering would still be detected when the container reached either its destination or an intermediate station having a system of the type shown at 10 in FIG. 1.

The present invention provides a number of technical advantages. One such technical advantage results from the provision of a seal device which is relatively difficult to defeat. In one form of the invention, the seal device includes a circuit which can electrically detect virtually any disruption of the seal. In a particular embodiment, the seal device includes a bolt which cooperates with the latching mechanism on the container, and which affects a magnetic field monitored by the circuit in the seal device. The seal device is structured so that unlocking of the container requires sufficient movement of the bolt to change the magnetic field in a way that can be detected.

A related advantage is realized where the seal device uses a unique and internally generated sealing event identification number which is separately recorded at the point of shipment, such that any tampering with or replacement of the seal device is readily detectable. In fact, even replacing the seal device with a visually identical seal device will not defeat the ability to reliably detect that tampering has occurred.

Still another advantage is realized where the circuit has the ability to respond to detection of tampering by immediately transmitting a wireless signal. While the container is in transit, it will periodically pass through facilities which have receivers for these wireless signals. If the container happens to be in one of these facilities at the time the tampering occurs, the occurrence of the tampering would be immediately detected, even before the thief has an opportunity to open the container door and begin pilfering the goods. Alternatively, if the tampering occurs while the container is in transit between facilities with such wireless monitoring capability, the tampering event will be detected virtually immediately upon arrival of the container at a facility with such capability.

Still another advantage is that, even while the container is in transit between facilities with wireless monitoring capability, the integrity of the seal can be quickly and easily checked by a person with a handheld device, in a manner involving far less manual time and effort than pre-existing inspection techniques. The wireless signals transmitted from each seal device to the wireless receivers not only facilitate monitoring of the integrity of the seals implemented by the seal devices, but also facilitate automated tracking of containers with little or no manual involvement, in order to ensure that each container moves reliably along the proper route to its destination.

A further advantage is that, through the improved tracking and sealing capabilities provided by the present invention, cargo theft from containers becomes significantly more difficult. This promotes a reduction in cargo theft and associated costs, such as investigations of theft, insurance paperwork, and insurance payments covering loss.

Although one embodiment has been illustrated and described in detail, it will be understood that various substitutions and alterations are possible without departing from the spirit and scope of the present invention, as defined by the following claims.

What is claimed is:

1. An apparatus comprising a self-contained unit which includes:
   sealing structure that can limit relative movement of two parts away from a first position toward a second position; and
   detection structure operable to sense a magnetic flux characteristic which is a function of said sealing structure, and to detect a change in said magnetic flux characteristic which represents a disruption of said sealing structure, said detection structure including a wireless transmitter, and transmitting a wireless signal containing an indication of whether said change in said magnetic flux characteristic has been detected.

2. An apparatus according to claim 1, including a container having an interior, said first and second parts being portions of said container, and wherein external access to said interior of said container is respectively obstructed and permitted when said parts are respectively in said first and second positions.

3. An apparatus, comprising:
   first and second parts movable relative to each other between first and second positions;
   sealing structure cooperable with said first and second parts in said first position thereof in a manner limiting movement of said parts away from said first position; and
   detection structure operable to sense a magnetic flux characteristic which is a function of said sealing structure, and to detect a change in said magnetic flux characteristic which represents a disruption of said sealing structure;
   wherein said detection structure includes a wireless transmitter, and transmits a wireless signal containing an indication of whether said change in said magnetic flux characteristic has been detected; and
   including a portable unit which can receive said wireless signal and provide on the basis thereof a visual indication of whether said change in said magnetic flux characteristic has been detected.

4. An apparatus, comprising:
   first and second parts movable relative to each other between first and second positions;
   sealing structure cooperable with said first and second parts in said first position thereof in a manner limiting movement of said parts away from said first position; and
   detection structure operable to sense a magnetic flux characteristic which is a function of said sealing structure, and to detect a change in said magnetic flux characteristic which represents a disruption of said sealing structure;
   wherein said detection structure includes a wireless transmitter, and transmits a wireless signal containing an indication of whether said change in said magnetic flux characteristic has been detected; and
   wherein said detection structure has a predefined unique identifier, and includes said identifier in wireless signals transmitted by said sealing structure.

5. An apparatus according to claim 4, wherein said detection structure begins said sensing in response to a predetermined event, said detection structure being responsive to said predetermined event for substantially randomly determining a number which said detection structure thereafter includes in wireless signals transmitted by said detection structure.

6. An apparatus, comprising:
   first and second parts movable relative to each other between first and second positions;
   sealing structure cooperable with said first and second parts in said first position thereof in a manner limiting movement of said parts away from said first position; and
   detection structure operable to sense a magnetic flux characteristic which is a function of said sealing structure, and to detect a change in said magnetic flux characteristic which represents a disruption of said sealing structure;
   wherein said detection structure begins said sensing in response to a predetermined event which includes receipt by said detection structure of a predetermined wireless signal.

7. An apparatus according to claim 6, including a manually operable portable unit which can selectively transmit said predetermined wireless signal.

8. An apparatus, comprising:
   first and second parts movable relative to each other between first and second positions;
   sealing structure cooperable with said first and second parts in said first position thereof in a manner limiting movement of said parts away from said first position; and
   detection structure operable to sense a magnetic flux characteristic which is a function of said sealing structure, and to detect a change in said magnetic flux characteristic which represents a disruption of said sealing structure;

wherein said sealing structure includes an elongate part;

wherein said detection structure includes first and second coils which encircle said elongate part at spaced locations therealong; and wherein said detection structure includes circuitry operable to cause said first coil to induce a magnetic field and to cause said second coil to sense said magnetic field.

9. An apparatus according to claim 8, wherein said container has a latch mechanism which includes said first and second parts; and wherein said sealing structure includes a lock mechanism, said elongate part being part of said lock mechanism and being made of a magnetically permeable material.

10. An apparatus according to claim 8, wherein said detection structure includes a housing, and includes an arm which extends from said housing and which has said first and second coils supported at spaced locations thereon, said housing having circuitry therein which is electrically coupled to said coils.

11. An apparatus according to claim 8, wherein said first and second parts have openings through which said elongate part extends, said first and second parts each being positioned on said elongate part between said first and second coils.

12. An apparatus according to claim 8, wherein said magnetic field induced by said circuitry in said first coil is a varying magnetic field; and wherein said detection structure carries out said sensing of said magnetic flux characteristic as a function of a phase shift between the signals in said first and second coils.

13. An apparatus according to claim 12, wherein said circuitry causes said first coil to induce said magnetic field by supplying to said first coil a plurality of pulses; and wherein said sensing of said magnetic flux characteristic by said circuitry includes determining for at least two of said pulses a phase shift between the pulse in the signal in said first coil and the corresponding pulse induced in said second coil.

14. An apparatus according to claim 12, wherein said circuitry causes said first coil to induce said magnetic field by supplying to said first coil a plurality of pulses; and wherein said sensing of said magnetic flux characteristic by said circuitry includes determining for at least two of said pulses other than the first of said pulses a phase shift between the pulse in the signal in said first coil and the corresponding pulse induced in said second coil, then calculating a sum by adding said phase shifts for respective said pulses, and then evaluating whether a difference between said sum and a previously-calculated value of said sum exceeds a predetermined value.

15. A method of operating a self-contained unit which has a sealing structure, comprising the steps of:

operating said sealing structure of said unit in a mode in which said sealing structure can limit relative movement of two parts away from a first position toward a second position;

sensing with structure of said self-contained unit a magnetic flux characteristic which is a function of said sealing structure;

detecting with structure of said self-contained unit a change in said magnetic flux characteristic which represents a disruption of said sealing structure; and transmitting from said self-contained unit a wireless signal containing an indication of whether said change in said magnetic flux characteristic has been detected.

16. A method, comprising the steps of:

effecting a seal between first and second parts movable relative to each other between first and second positions, including the provision of sealing structure cooperable with said first and second parts in said first position thereof in a manner limiting movement of said parts away from said first position;

sensing a magnetic flux characteristic which is a function of said sealing structure; and detecting a change in said magnetic flux characteristic which represents a disruption of said sealing structure;

including the step of transmitting a wireless signal containing an indication of whether said change in said magnetic flux characteristic has been detected; and including the step of providing within said wireless signals a unique identifier.

17. A method according to claim 16, including the step of responding to a predetermined event by commencing said sensing and by substantially randomly determining a number which is thereafter included in said wireless signals.

18. A method, comprising the steps of:

effecting a seal between first and second parts movable relative to each other between first and second positions, including the provision of sealing structure cooperable with said first and second parts in said first position thereof in a manner limiting movement of said parts away from said first position;

sensing a magnetic flux characteristic which is a function of said sealing structure;

detecting a change in said magnetic flux characteristic which represents a disruption of said sealing structure;

inducing said magnetic field in a first coil as a varying magnetic field; and effecting said sensing of said magnetic flux characteristic using a second coil; and effecting said detecting of a change in said magnetic flux characteristic as a function of a phase shift between the signals in said first and second coils.

19. A method according to claim 18, wherein said inducing step includes supplying to said first coil a plurality of pulses; and wherein said detecting step includes determining for at least two of said pulses other than the first of said pulses a phase shift between the pulse in the signal in said first coil and the corresponding pulse induced in said second coil, then calculating a sum by adding said phase shifts for respective said pulses, and then evaluating whether a difference between said sum and a previously-calculated value of said sum exceeds a predetermined value.

* * * * *